No. 747,211. Patented December 15, 1903.

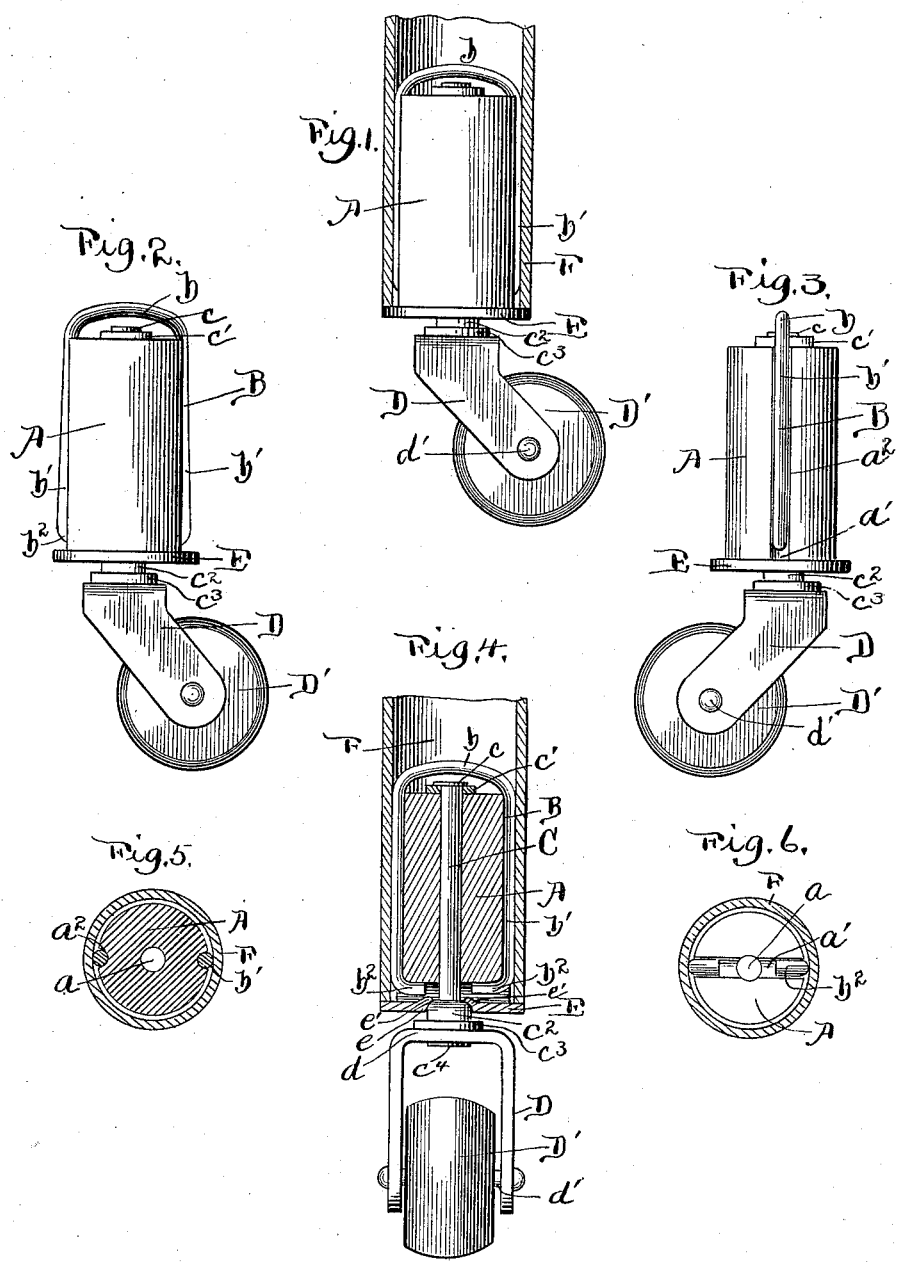

UNITED STATES PATENT OFFICE.

DAVID NICKEL, OF MORRIS, ILLINOIS.

CASTER.

SPECIFICATION forming part of Letters Patent No. 747,211, dated December 15, 1903.

Application filed February 9, 1903. Serial No. 142,656. (No model.)

*To all whom it may concern:*

Be it known that I, DAVID NICKEL, a citizen of the United States, residing at Morris, in the county of Grundy and State of Illinois, have invented certain new and useful Improvements in Casters, of which the following is a specification.

This invention relates to appliances for holding the caster and pintle securely in place within the bedpost or other support into which it is inserted; and the invention more particularly relates to a contractible wedge and support therefor which insure a secure contact and to the arrangement by which the pintle is rotatably mounted and supported.

The invention further consists in the features of construction and combination of parts hereinafter described and claimed.

In the drawings, Figure 1 is a side elevation of the contractible wedge support and mounting inserted into place within a tubular socket or post; Fig. 2, a similar view showing the caster and mounting removed; Fig. 3, a view showing the mounting turned with respect to Fig. 2; Fig. 4, a sectional elevation of the caster and mounting; Fig. 5, a cross-sectional view of the caster of Fig. 1, and Fig. 6 a bottom view of the mounting.

As shown, the caster is formed with a mounting or plug A, preferably of cylindrical shape and of a sufficient length to insure a rigid support for the pintle inserted therein, the said mounting being provided at its center with a pivotal hole $a$, extending throughout its length for the passage of the pintle. The lower end of the center mounting or plug has a cross-slot $a'$, which extends across the full face thereof, and the exterior face of the plug or mounting has therein and longitudinally thereof grooves $a^2$, located on opposite sides of the plug or mounting. The plug or mounting may be formed of wood, metal, or other suitable material and should be of a diameter slightly smaller than the interior diameter of the post or other receiver with which the caster is to be used.

The mounting carries a retaining or binding spring B, preferably made of round wire, but which could be made of other material curved or bent into shape to have a cross-head $b$ at the upper end and side arms $b'$, the side arms at their lower ends each having an inward turn to form stops or fingers $b^2$ in the construction shown, and, as shown in Fig. 2, the side arms are formed to have a slight divergence toward their lower or free ends when in normal or relaxed relation. The side arms are adapted to lie one within each longitudinal groove of the plug or mounting and have their stops or fingers enter the cross end slot in the bottom of the mounting, one on each side of the pintle-hole, and thereby hold the spring in place on the plug or mounting and prevent its withdrawal therefrom, thus retaining the spring in position without having it rigidly attached at any point thereof to interfere with its contraction and expansion. The longitudinal grooves $a^2$ of the plug or mounting are of a depth to enable the side arms of the spring to lie partially, but not wholly, embedded therein, so that when the caster is inserted into place within its receiving-socket the side arms of the spring will be compressed, more especially at their lower end, causing the inner face of the arms to contact with and impinge against the face of the longitudinal grooves and likewise to cause the outer face of the side arms to contact with and impinge against the inner face of the wall of the entered socket or post, thereby, in effect, forming a rigid or continuous contact between the socket and the mounting through the medium of the retaining or binding spring, as will appear from an inspection of Fig. 4.

The pintle C extends through the pivotal hole $a'$ at the center of the mounting, so that the pintle C is rotatable in the plug or mounting. The upper end $c$ of the pintle, as shown, is upset or flared down against a washer $c'$, holding the pintle within the mounting against end withdrawal and free to turn or rotate the post or support. The pintle is provided near its lower end with a rounded boss or collar $c^2$, below which is a flange $c^3$, the boss and flange being preferably formed integral with the pintle, and the extreme lower end $c^4$ of the pintle is preferably riveted down onto the cross-head $d$ of the ordinary yoke or support D for the roller D', which is mounted in the yoke by a journal or pivot-pin $d'$, as usual. Between the rounded boss or collar and the lower face of the plug or mounting is a plate or disk E, having in its center a bearing-hole e, the edges e' of which are preferably turned inwardly, forming a contact-bearing with the face of the rounded boss or collar, giving a center bearing for the yoke and roller of the caster on the rounded boss or collar, and, as shown, when the caster as a whole is in place in the socket or tubular post F the lower edge of the latter will contact with the rim of the disk or plate, which is of a sufficient diameter to entirely close the end of the socket or tubular post.

The caster as a whole is centered and held in position solely by the plug or mounting by reason of the impingement of the retaining or binding spring, which locks the plug or mounting solidly in the socket or post, holding the plug or mounting in a fixed relation and at the same time allowing the caster to swing around in use. The caster is inserted into a socket or tube of slightly-larger diameter than the plug or mounting, causing the inner or free ends of the spring to be contracted under tension as the plug or mounting is forced home for the disk to bear against the end of the socket or tube, after which the roller, yoke, and pintle are free to revolve within the mounting, which forms, in effect, an integral part of the socket or tube.

What I regard as new, and desire to secure by Letters Patent, is—

1. In a caster, the combination of a yoke, a roller rotatably mounted therein, a pintle upwardly extending therefrom, a mounting within which the pintle is rotatably mounted, a recess in the body of the mounting, and an unattached retaining or binding spring encircling the mounting and provided with inwardly-extending fingers adapted to be compressed into the recess in the body of the mounting, substantially as described.

2. In a caster, the combination of a yoke, a roller rotatably mounted therein, a pintle fixedly attached thereto, a cylindrical mounting within which the pintle is rotatably mounted provided in its lower face with radially-extending grooves, and provided in its outer face with longitudinally-extending grooves, and an unattached retaining or binding spring provided with normally diverging side arms adapted to lie within the longitudinally-extending grooves and inwardly-extending fingers adapted to lie within the radially-extending grooves and be compressed thereinto, substantially as described.

3. In a caster, the combination of a yoke, a roller rotatably mounted therein, a pintle fixedly attached thereto, a mounting within which the pintle is rotatably mounted provided in its lower face with radially-extending grooves, and provided in its outer face with longitudinally-extending grooves, a retaining or binding spring provided with side arms adapted to lie within the longitudinally-extending grooves and inwardly-extending fingers adapted to lie within the radially-extending grooves and be compressed thereinto, and a disk or plate, through which the pintle extends, of a size to inclose the radially-extending grooves and bear against the end of the tubular post into which the caster is inserted, substantially as described.

4. In a caster, the combination of a yoke, a roller rotatably mounted therein, a pintle upwardly extending therefrom, a rounded boss or collar at the lower end of the pintle, a disk or plate surrounding the pintle and affording a bearing-surface for the rounded boss or collar, a mounting through which the pintle extends and within which it is rotatably held, said mounting being provided in its body with recesses terminating in longitudinally-extending grooves, and a retaining or binding spring surrounding the mounting provided with arms adapted to lie within the longitudinally-extending grooves and terminating in fingers adapted to be compressed into the recesses in the mounting, substantially as described.

DAVID NICKEL.

Witnesses:
GEORGE C. GARDNER,
L. E. MARSHALL.